(12) United States Patent
Moskowitz et al.

(10) Patent No.: US 8,225,099 B2
(45) Date of Patent: *Jul. 17, 2012

(54) LINEAR PREDICTIVE CODING IMPLEMENTATION OF DIGITAL WATERMARKS

(75) Inventors: Scott A. Moskowitz, Sunny Isles Beach, FL (US); Marc Cooperman, Short Hills, NJ (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/798,959

(22) Filed: Apr. 14, 2010

(65) Prior Publication Data

US 2010/0202607 A1    Aug. 12, 2010

Related U.S. Application Data

(60) Continuation of application No. 11/592,079, filed on Nov. 2, 2006, now Pat. No. 7,730,317, which is a continuation of application No. 11/026,234, filed on Dec. 30, 2004, now Pat. No. 7,152,162, which is a continuation of application No. 09/456,319, filed on Dec. 8, 1999, now Pat. No. 6,853,726, which is a division of application No. 08/772,222, filed on Dec. 20, 1996, now Pat. No. 6,078,664.

(51) Int. Cl.
*G06F 21/00* (2006.01)
(52) U.S. Cl. ...................................................... 713/176
(58) Field of Classification Search ........................ None
See application file for complete search history.

(56) References Cited

U.S. PATENT DOCUMENTS

| | | |
|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |

(Continued)

FOREIGN PATENT DOCUMENTS

EP    0372601    6/1990

(Continued)

OTHER PUBLICATIONS

EPO Application No. 96919405.9, entitled "Steganographic Method and Device"; published as EP0872073 (A2), Oct. 21, 1998.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
PCT Application No. PCT/US00/21189, filed Aug. 4, 2000, entitled, "A Secure Personal Content Server", Pub. No. WO/2001/018628 ; Publication Date: Mar. 15, 2001.
Schneier, Bruce, Applied Cryptography, 2nd Ed., John Wiley & Sons, pp. 9-10, 1996.
Alfred J., Handbook of Applied Cryptography, CRC Press, p. 46, 1997.

(Continued)

*Primary Examiner* — Benjamin Lanier
(74) *Attorney, Agent, or Firm* — Neifeld IP Law, PC

(57) ABSTRACT

Z-transform calculations may be used to encode (and/or decode) carrier signal independent data (e.g., digital watermarks) to a digital sample stream. Deterministic and non-deterministic components of a digital sample stream signal may be analyzed for the purposes of encoding carrier signal independent data to the digital sample stream. The carrier signal independent data may be encoded in a manner such that it is restricted or concentrated primarily in the non-deterministic signal components of the carrier signal. The signal components can include a discrete series of digital samples and/or a discreet series of carrier frequency sub-bands of the carrier signal. Z-transform calculations may be used to measure a desirability of particular locations and a sample stream in which to encode the carrier signal independent data.

23 Claims, No Drawings

U.S. PATENT DOCUMENTS

| | | | |
|---|---|---|---|
| 5,406,627 | A | 4/1995 | Thompson et al. |
| 5,408,505 | A | 4/1995 | Indeck et al. |
| 5,410,598 | A | 4/1995 | Shear |
| 5,412,718 | A | 5/1995 | Narasimhalv et al. |
| 5,418,713 | A | 5/1995 | Allen |
| 5,428,606 | A | 6/1995 | Moskowitz |
| 5,450,490 | A | 9/1995 | Jensen et al. |
| 5,469,536 | A | 11/1995 | Blank |
| 5,471,533 | A | 11/1995 | Wang et al. |
| 5,478,990 | A | 12/1995 | Montanari et al. |
| 5,479,210 | A | 12/1995 | Cawley et al. |
| 5,487,168 | A | 1/1996 | Geiner et al. |
| 5,493,677 | A | 2/1996 | Balogh et al. |
| 5,497,419 | A | 3/1996 | Hill |
| 5,506,795 | A | 4/1996 | Yamakawa |
| 5,513,126 | A | 4/1996 | Harkins et al. |
| 5,513,261 | A | 4/1996 | Maher |
| 5,530,739 | A | 6/1996 | Okada |
| 5,530,751 | A | 6/1996 | Morris |
| 5,530,759 | A | 6/1996 | Braudaway et al. |
| 5,539,735 | A | 7/1996 | Moskowitz |
| 5,548,579 | A | 8/1996 | Lebrun et al. |
| 5,568,570 | A | 10/1996 | Rabbani |
| 5,579,124 | A | 11/1996 | Aijala et al. |
| 5,581,703 | A | 12/1996 | Baugher et al. |
| 5,583,488 | A | 12/1996 | Sala et al. |
| 5,598,470 | A | 1/1997 | Cooper et al. |
| 5,606,609 | A | 2/1997 | Houser et al. |
| 5,613,004 | A | 3/1997 | Cooperman et al. |
| 5,617,119 | A | 4/1997 | Briggs et al. |
| 5,625,690 | A | 4/1997 | Michel et al. |
| 5,629,980 | A | 5/1997 | Stefik et al. |
| 5,633,932 | A | 5/1997 | Davis et al. |
| 5,634,040 | A * | 5/1997 | Her et al. ................... 345/629 |
| 5,636,276 | A | 6/1997 | Brugger |
| 5,636,292 | A | 6/1997 | Rhoads |
| 5,640,569 | A | 6/1997 | Miller et al. |
| 5,646,997 | A | 7/1997 | Barton |
| 5,657,461 | A | 8/1997 | Harkins et al. |
| 5,659,726 | A | 8/1997 | Sandford, II et al. |
| 5,664,018 | A | 9/1997 | Leighton |
| 5,673,316 | A | 9/1997 | Auerbach et al. |
| 5,677,952 | A | 10/1997 | Blakley et al. |
| 5,680,462 | A | 10/1997 | Miller et al. |
| 5,687,236 | A | 11/1997 | Moskowitz et al. |
| 5,689,587 | A | 11/1997 | Bender et al. |
| 5,696,828 | A | 12/1997 | Koopman, Jr. |
| 5,719,937 | A | 2/1998 | Warren et al. |
| 5,721,788 | A | 2/1998 | Powell et al. |
| 5,734,752 | A | 3/1998 | Knox |
| 5,737,416 | A | 4/1998 | Cooper et al. |
| 5,737,733 | A | 4/1998 | Eller |
| 5,740,244 | A | 4/1998 | Indeck et al. |
| 5,745,569 | A | 4/1998 | Moskowitz et al. |
| 5,748,783 | A | 5/1998 | Rhoads |
| 5,751,811 | A | 5/1998 | Magnotti et al. |
| 5,754,697 | A | 5/1998 | Fu et al. |
| 5,757,923 | A | 5/1998 | Koopman, Jr. |
| 5,765,152 | A | 6/1998 | Erickson |
| 5,768,396 | A | 6/1998 | Sone |
| 5,774,452 | A | 6/1998 | Wolosewicz |
| 5,790,677 | A | 8/1998 | Fox et al. |
| 5,799,083 | A | 8/1998 | Brothers et al. |
| 5,809,139 | A | 9/1998 | Grirod et al. |
| 5,809,160 | A | 9/1998 | Powell et al. |
| 5,818,818 | A | 10/1998 | Soumiya |
| 5,822,432 | A | 10/1998 | Moskowitz et al. |
| 5,828,325 | A | 10/1998 | Wolosewicz et al. |
| 5,832,119 | A | 11/1998 | Rhoads |
| 5,842,213 | A | 11/1998 | Odom |
| 5,848,155 | A | 12/1998 | Cox |
| 5,850,481 | A | 12/1998 | Rhoads |
| 5,859,920 | A | 1/1999 | Daly et al. |
| 5,860,099 | A | 1/1999 | Milios et al. |
| 5,862,260 | A | 1/1999 | Rhoads |
| 5,870,474 | A | 2/1999 | Wasilewski et al. |
| 5,884,033 | A | 3/1999 | Duvall et al. |
| 5,889,868 | A | 3/1999 | Moskowitz et al. |
| 5,893,067 | A | 4/1999 | Bender et al. |
| 5,894,521 | A | 4/1999 | Conley |
| 5,903,721 | A | 5/1999 | Sixtus |
| 5,905,800 | A | 5/1999 | Moskowitz et al. |
| 5,905,975 | A | 5/1999 | Ausubel |
| 5,912,972 | A | 6/1999 | Barton |
| 5,915,027 | A | 6/1999 | Cox et al. |
| 5,917,915 | A | 6/1999 | Hirose |
| 5,918,223 | A | 6/1999 | Blum |
| 5,920,900 | A | 7/1999 | Poole et al. |
| 5,923,763 | A | 7/1999 | Walker et al. |
| 5,930,369 | A | 7/1999 | Cox et al. |
| 5,930,377 | A | 7/1999 | Powell et al. |
| 5,940,134 | A | 8/1999 | Wirtz |
| 5,943,422 | A | 8/1999 | Van Wie et al. |
| 5,949,055 | A | 9/1999 | Fleet |
| 5,963,909 | A | 10/1999 | Warren et al. |
| 5,973,731 | A * | 10/1999 | Schwab ................... 348/161 |
| 5,974,141 | A * | 10/1999 | Saito ................... 705/52 |
| 5,991,426 | A | 11/1999 | Cox et al. |
| 5,999,217 | A * | 12/1999 | Berners-Lee ........... 375/240.14 |
| 6,009,176 | A * | 12/1999 | Gennaro et al. ........... 713/170 |
| 6,029,126 | A | 2/2000 | Malvar |
| 6,041,316 | A * | 3/2000 | Allen ................... 705/52 |
| 6,044,471 | A | 3/2000 | Colvin |
| 6,049,838 | A * | 4/2000 | Miller et al. ................... 719/315 |
| 6,051,029 | A | 4/2000 | Paterson et al. |
| 6,061,793 | A | 5/2000 | Tewfik et al. |
| 6,067,622 | A | 5/2000 | Moore |
| 6,069,914 | A | 5/2000 | Cox |
| 6,078,664 | A | 6/2000 | Moskowitz et al. |
| 6,081,251 | A * | 6/2000 | Sakai et al. ................... 345/670 |
| 6,081,587 | A | 6/2000 | Reyes et al. |
| 6,081,597 | A | 6/2000 | Hoffstein |
| 6,088,455 | A * | 7/2000 | Logan et al. ................... 380/200 |
| 6,131,162 | A | 10/2000 | Yoshiura et al. |
| 6,141,753 | A | 10/2000 | Zhao et al. |
| 6,141,754 | A | 10/2000 | Choy |
| 6,148,333 | A | 11/2000 | Guedalia |
| 6,154,571 | A | 11/2000 | Cox et al. |
| 6,192,138 | B1 | 2/2001 | Yamadaji |
| 6,199,058 | B1 | 3/2001 | Wong et al. |
| 6,205,249 | B1 | 3/2001 | Moskowitz |
| 6,208,745 | B1 | 3/2001 | Florenio et al. |
| 6,226,618 | B1 | 5/2001 | Downs |
| 6,230,268 | B1 | 5/2001 | Miwa et al. |
| 6,233,347 | B1 | 5/2001 | Chen et al. |
| 6,233,684 | B1 | 5/2001 | Stefik et al. |
| 6,240,121 | B1 | 5/2001 | Senoh |
| 6,263,313 | B1 | 7/2001 | Milsted et al. |
| 6,272,634 | B1 | 8/2001 | Tewfik et al. |
| 6,275,988 | B1 * | 8/2001 | Nagashima et al. ............... 725/8 |
| 6,278,780 | B1 | 8/2001 | Shimada |
| 6,278,791 | B1 | 8/2001 | Honsinger et al. |
| 6,282,300 | B1 | 8/2001 | Bloom et al. |
| 6,282,650 | B1 | 8/2001 | Davis |
| 6,285,775 | B1 | 9/2001 | Wu et al. |
| 6,301,663 | B1 | 10/2001 | Kato et al. |
| 6,310,962 | B1 | 10/2001 | Chung et al. |
| 6,330,335 | B1 | 12/2001 | Rhoads |
| 6,330,672 | B1 | 12/2001 | Shur |
| 6,345,100 | B1 | 2/2002 | Levine |
| 6,351,765 | B1 | 2/2002 | Pietropaolo et al. |
| 6,363,483 | B1 | 3/2002 | Keshav |
| 6,373,892 | B1 * | 4/2002 | Ichien et al. ............. 375/240.08 |
| 6,373,960 | B1 | 4/2002 | Conover et al. |
| 6,374,036 | B1 | 4/2002 | Ryan et al. |
| 6,377,625 | B1 | 4/2002 | Kim |
| 6,381,618 | B1 | 4/2002 | Jones et al. |
| 6,381,747 | B1 * | 4/2002 | Wonfor et al. ................. 725/104 |
| 6,385,324 | B1 | 5/2002 | Koppen |
| 6,385,329 | B1 | 5/2002 | Sharma et al. |
| 6,385,596 | B1 | 5/2002 | Wiser |
| 6,389,538 | B1 | 5/2002 | Gruse et al. |
| 6,405,203 | B1 | 6/2002 | Collart |
| 6,415,041 | B1 | 7/2002 | Oami et al. |
| 6,418,421 | B1 | 7/2002 | Hurtado |
| 6,425,081 | B1 | 7/2002 | Iwamura |
| 6,430,301 | B1 | 8/2002 | Petrovic |

| Patent No. | Date | Inventor |
|---|---|---|
| 6,430,302 B2 * | 8/2002 | Rhoads .................. 382/100 |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,484,264 B1 | 11/2002 | Colvin |
| 6,493,457 B1 | 12/2002 | Quackenbush |
| 6,502,195 B1 | 12/2002 | Colvin |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,590,996 B1 | 7/2003 | Reed |
| 6,598,162 B1 | 7/2003 | Moskowitz |
| 6,606,393 B1 | 8/2003 | Xie et al. |
| 6,611,599 B2 | 8/2003 | Natarajan |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,842,862 B2 | 1/2005 | Chow et al. |
| 6,853,726 B1 | 2/2005 | Moskowitz et al. |
| 6,857,078 B2 | 2/2005 | Colvin |
| 6,865,747 B1 | 3/2005 | Mercier |
| 6,931,534 B1 | 8/2005 | Jandel et al. |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,986,063 B2 | 1/2006 | Colvin |
| 6,990,453 B2 | 1/2006 | Wang |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,647,502 B2 | 1/2010 | Moskowitz |
| 7,647,503 B2 | 1/2010 | Moskowitz |
| 7,664,263 B2 | 2/2010 | Moskowitz |
| 7,743,001 B1 | 6/2010 | Vermeulen |
| 7,761,712 B2 | 7/2010 | Moskowitz |
| 7,779,261 B2 | 8/2010 | Moskowitz |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0056041 A1 | 5/2002 | Moskowitz |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0161741 A1 | 10/2002 | Wang et al. |
| 2003/0002862 A1 | 1/2003 | Rodriguez |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |

| | | | |
|---|---|---|---|
| 2008/0016365 | A1 | 1/2008 | Moskowitz |
| 2008/0022113 | A1 | 1/2008 | Moskowitz |
| 2008/0022114 | A1 | 1/2008 | Moskowitz |
| 2008/0028222 | A1 | 1/2008 | Moskowitz |
| 2008/0046742 | A1 | 2/2008 | Moskowitz |
| 2008/0075277 | A1 | 3/2008 | Moskowitz et al. |
| 2008/0109417 | A1 | 5/2008 | Moskowitz |
| 2008/0133927 | A1 | 6/2008 | Moskowitz et al. |
| 2008/0151934 | A1 | 6/2008 | Moskowitz et al. |
| 2009/0037740 | A1 | 2/2009 | Moskowitz |
| 2009/0089427 | A1 | 4/2009 | Moskowitz et al. |
| 2009/0190754 | A1 | 7/2009 | Moskowitz et al. |
| 2009/0210711 | A1 | 8/2009 | Moskowitz |
| 2009/0220074 | A1 | 9/2009 | Moskowitz et al. |
| 2010/0002904 | A1 | 1/2010 | Moskowitz |
| 2010/0005308 | A1 | 1/2010 | Moskowitz |
| 2010/0064140 | A1 | 3/2010 | Moskowitz |
| 2010/0077219 | A1 | 3/2010 | Moskowitz |
| 2010/0077220 | A1 | 3/2010 | Moskowitz |
| 2010/0098251 | A1 | 4/2010 | Moskowitz |
| 2010/0106736 | A1 | 4/2010 | Moskowitz |
| 2010/0153734 | A1 | 6/2010 | Moskowitz |
| 2010/0182570 | A1 | 7/2010 | Matsumoto et al. |
| 2010/0202607 | A1 | 8/2010 | Moskowitz |
| 2010/0220861 | A1 | 9/2010 | Moskowitz |

FOREIGN PATENT DOCUMENTS

| | | |
|---|---|---|
| EP | 0565947 | 10/1993 |
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO9701892 | 6/1995 |
| WO | WO 9629795 | 9/1996 |
| WO | WO 9642151 | 12/1996 |
| WO | WO 9726733 | 1/1997 |
| WO | WO 9724833 | 7/1997 |
| WO | WO9726732 | 7/1997 |
| WO | WO 9802864 | 7/1997 |
| WO | WO 9744736 | 11/1997 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO 0118628 | 3/2001 |
| WO | WO 0143026 | 6/2001 |
| WO | WO0203385 | 1/2002 |
| WO | WO0203385 A1 | 10/2002 |

OTHER PUBLICATIONS

1997, Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40,No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N. S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251, Unknown date.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33, Unknown date.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213, Unknown date.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.

Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "PayWord and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4, 1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
Staind (The Singles 1996-2006), Warner Music—Atlantic, Pre-Release CD image, 2006, 1 page.
Radiohead ("Hail To The Thief"), EMI Music Group—Capitol, Pre-Release CD image, 2003, 1 page.
U.S. Appl. No. 60/169,274, filed Dec. 7, 1999, entitled "Systems, Methods And Devices For Trusted Transactions".
U.S. Appl. No. 60/234,199, filed Sep. 20, 2000, "Improved Security Based on Subliminal and Supraliminal Channels For Data Objects".

U.S. Appl. No. 09/671,739, filed Sep. 29, 2000, entitled "Method And Device For Monitoring And Analyzing Signals".
Tirkel, A.Z., "A Two-Dimensional Digital Watermark", Scientific Technology, 686, 14, date unknown. (citation revised upon review on Nov. 16, 2010 by RAN.).
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP502 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.

PCT Application No. PCT/US97/00651, filed Jan. 16, 1997, entitled, "Method for Stega-Cipher Protection of Computer Code", published as WO/1997/026732; Publication Date: Jul. 24, 1997.

PCT Application No. PCT/US97/00652, filed Jan. 17, 1997, entitled, "Method for an Encrypted Digital Watermark", published as WO/1997/026733; Publication Date: Jul. 24, 1997.

PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.

PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.

PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.

PCT Application No. PCT/US00/18411, filed Jul. 5, 2000, entitled, "Copy Protection of Digital Data Combining Steganographic and Cryptographic Techniques".

PCT Application No. PCT/US00/33126, filed Dec. 7, 2000, entitled "Systems, Methods and Devices for Trusted Transactions", published as WO/2001/043026; Publication Date: Jun. 14, 2001.

EPO Divisional Patent Application No. 07112420.0, entitled "Steganographic Method and Device" corresponding to PCT Application No. PCT/US96/10257, published as WO/1996/042151, Dec. 27, 1996.

U.S. Appl. No. 60/222,023, filed Jul. 31, 2007 entitled "Method and apparatus for recognizing sound and signals in high noise and distortion".

"Techniques for Data Hiding in Audio Files," by Morimoto, 1995.

Howe, Dennis Jul. 13, 1998 http://foldoc..org//steganography.

CSG, Computer Support Group and CSGNetwork.com 1973 http://www.csgnetwork.com/glossarys.html.

QuinStreet Inc. 2010 What is steganography?—A word definition from the Webopedia Computer Dictionary http://www.webopedia.com/terms/steganography.html.

Graham, Robert Aug. 21, 2000 "Hacking Lexicon" http://robertgraham.com/pubs/hacking-dict.html.

Farkex, Inc 2010 "Steganography definition of steganography in the Free Online Encyclopedia" http://encyclopedia2.Thefreedictionary.com/steganography.

Horowitz, et al., The Art of Eletronics. $2^{nd}$ Ed., 1989, pp7.

Jimmy eat world ("futures"), Interscope Records, Pre-Release CD image, 2004, 1 page.

Aerosmith ("Just Push Play"), Pre-Release CD image, 2001, 1 page.

Phil Collins(Testify) Atlantic, Pre-Release CD image, 2002, 1 page.

* cited by examiner

LINEAR PREDICTIVE CODING IMPLEMENTATION OF DIGITAL WATERMARKS

RELATED APPLICATIONS

This application is a continuation of pending U.S. patent application No. 11/592,079, filed Nov. 2, 2006, now U.S. Pat. No. 7,730,317 issued Jun. 1, 2010, which is a continuation of U.S. application No. 11/026,234, filed Dec. 30, 2004, now U.S. Pat. No. 7,152,162 issued Dec. 19, 2006, which is a continuation of U.S. patent application No. 09/456,319, filed Dec. 8, 1999, now U.S. Pat. No. 6,853,726 issued Feb. 8, 2005, which is a division of U.S. patent application No. 08/772,222, filed Dec. 20, 1996, now U.S. Pat. No. 6,078,664 issued Jun. 20, 2000. The previously identified patents and/or patent applications are hereby incorporated by reference, in their entireties.

This application relates to U.S. patent application Ser. No. 08/489,172 filed on Jun. 7, 1995, now U.S. Pat. No. 5,613,004 issued Mar. 18, 1997, U.S. patent application Ser. No. 08/587,944 filed on Jan. 17, 1996, now U.S. Pat. No. 5,822,432 issued Oct. 13, 1998, U.S. patent application Ser. No. 08/587,943 filed on Jan. 16, 1996, now U.S. Pat. No. 5,745,569 issued Apr. 28, 1998, and U.S. patent application Ser. No. 08/677,435 filed on Jul. 2, 1996, now U.S. Pat. No. 5,889,868 issued Mar. 30, 1999. Each of these related applications is incorporated herein by reference in their entirety.

BACKGROUND OF THE INVENTION

Digital distribution of multimedia content (audio, video, etc.) and the impending convergence of industries that seek to make this goal a reality (computer, telecommunications, media, electric power, etc.) collide with the simplicity of making perfect digital copies. There exists a vacuum in which content creators resist shifts to full digital distribution systems for their digitized works, due to the lack of a means to protect the copyrights of these works. In order to make such copyright protection possible, there must exist a mechanism to differentiate between a master and any of its derivative copies. The advent of digital watermarks makes such differentiation possible. With differentiation, assigning responsibility for copies as they are distributed can assist in the support and protection of underlying copyrights and other "neighboring rights," as well as, the implementation of secure metering, marketing, and other as yet still undecided applications. Schemes that promote encryption, cryptographic containers, closed systems, and the like attempt to shift control of copyrights from their owners to third parties, requiring escrow of masters and payment for analysis of suspect, pirated copies. A frame-based, master-independent, multi-channel watermark system is disclosed in U.S. patent application Ser. No. 08/489,172 filed on Jun. 7, 1995 and entitled "STEGANOGRAPHIC METHOD AND DEVICE" (now U.S. Pat. No. 5,613,004 issued Mar. 18, 1997), U.S. patent application Ser. No. 08/587,944 filed on Jan. 17, 1996 and entitled "METHOD FOR HUMAN-ASSISTED RANDOM KEY GENERATION AND APPLICATION FOR DIGITAL WATERMARK SYSTEM" (now U.S. Pat. No. 5,822,432 issued Oct. 13, 1998), and U.S. patent application Ser. No. 08/587,943 filed on Jan. 16, 1996 and entitled "METHOD FOR STEGA-CIPHER PROTECTION OF COMPUTER CODE" (now U.S. Pat. No. 5,745,569 issued Apr. 28, 1998). These applications describe methods by which copyright holders can watermark and maintain control over their own content. Any suspect copies carry all necessary copyright or other "rights" information within the digitized signal and possession of an authorized "key" and the software (or even hardware) described in these applications would make determination of ownership or other important issues a simple operation for the rights holder or enforcer.

Optimizing watermark insertion into a given signal is further described in the U.S. patent application Ser. No. 08/677,435 filed on Jul. 2, 1996 and entitled "OPTIMIZATION METHODS FOR THE INSERTION, PROJECTION AND DETECTION OF DIGITAL WATERMARKS IN DIGITIZED DATA", (now U.S. Pat. No. 5,889,868 issued Mar. 30, 1999). This application discloses accounting for the wide range of digitally-sampled signals including audio, video, and derivations thereof that may constitute a "multimedia" signal. The optimization techniques described in that application take into account the two components of all digitization systems: error coding and digital filters. The premise is to provide a better framework or definition of the actual "aesthetic" that comprises the signal being reproduced, whether through commercial standards of output (NTSC, CD-quality audio, etc.) or lossless and lossy compression (MPEG-2, Perceptual Audio Coding, AC-3, Linear Adaptive Coding, and the like), so that a watermark may be targeted at precisely the part of the signal comprising such an "aesthetic" in order that it be as robust as possible (i.e., difficult to remove without damaging the perceptual quality of the signal). However the content is stored, the signal still carries the digital watermark. Additionally, transmission media may be characterized as a set of "filters" that may be pre-analyzed to determine the best "areas" of the signal in which watermarks "should" be encoded, to preserve watermarks in derivative copies and ensure maximum destruction of the main, carrier signal when attempts are made to erase or alter the watermarked content.

Optimal planning of digital watermark insertion can be based on the inversion of digital filters to establish or map areas comprising a given content signal's "insertion envelope." That is, the results of the filter operation are considered in order to "back out" a solution. In the context of this discussion, the phrase "inverting" a filter may mean, alternatively, mathematical inversion, or the normal computation of the filter to observe what its effect would be, were that filter applied at a later time. Planning operations will vary for given digitized content: audio, video, multimedia, etc. Planning will also vary depending on where a given "watermarker" is in the distribution chain and what particular information needs that user has in encoding a given set of information fields into the underlying content. The disclosures described take into account discrete-time signal processing which can be accomplished with Fast Fourier Transforms that are well-known in the art of digital signal processing. Signal characteristics are also deemed important: a specific method for analysis of such characteristics and subsequent digital watermarking is disclosed in further detail in this application. The antecedents of the present invention cover time and frequency domain processing, which can be used to examine signal characteristics and make modifications to the signal. A third way would be to process with z-transforms that can establish signal characteristics in a very precise manner over discrete instances of time. In particular, z-transform calculations can be used to separate the deterministic, or readily predictable, components of a signal from the non-deterministic (unpredictable or random) components. It should be apparent to those skilled in the art that non-deterministic is a subjective term whose interpretation is implicitly affected by processing power, memory, and time restrictions. With unlimited DSP (digital signal processing) power, memory, and time to process, we might theoretically predict every component of a signal. However, practicality imposes limitations. The results of the z-transform calculations will yield an estimator of the signal in the form of a deterministic approximation. The difference between a signal reconstituted from the deterministic estimator and the real signal can be referred to as error, and the error in an estimator can be further analyzed for statistical characteristics. Those skilled in the art will be aware that Linear Predictive Coding (LPC) techniques make use of these properties. So the error can be modeled, but is difficult to reproduce exactly from compressed representations. In essence, this error represents the randomness in a signal which is hard to compress or reproduce, but in fact may contribute significantly to the gestalt perception of the signal.

The more elements of error determined with z-transforms, the better able a party is at determining just what parts of a given carrier signal are deterministic, and thus predictable, and what elements are random. The less predictable the watermark-bearing portion of a signal is and the more it contributes to the perception of the signal, as previously disclosed, the more secure a digital watermark can be made. Z-transform analysis would disclose just which phase components are deterministic and which are random. This is because it is difficult to compress or otherwise remove unpredictable signal components. Error analysis further describes the existence of error function components and would reliably predict what signals or data may later be removed by additional z-transform analysis or other compression techniques. In effect, the error analysis indicates how good an approximation can be made, another way of stating how predictable a signal is, and by implication, how much randomness it contains. Z-transforms are thus a specialized means to optimize watermark insertion and maximize the resulting security of encoded data from attempts at tampering. The results of a Z-transform of input samples could be analyzed to see "exactly" how they approximate the signal, and how much room there is for encoding watermarks in a manner that they will not be removed by compression techniques which preserve a high degree of reproduction quality.

Time is typically described as a single independent variable in signal processing operations but in many cases operations can be generalized to multidimensional or multichannel signals. Analog signals are defined continuously over time, while digital signals are sampled at discrete time intervals to provide a relatively compact function, suitable for storage on a CD, for instance, defined only at regularly demarcated intervals of time. The accrued variables over time provide a discrete-time signal that is an approximation of the actual non-discrete analog signal. This discreteness is the basis of a digital signal. If time is unbounded and the signal comprises all possible values, a continuous-valued signal results. The method for converting a continuous-valued signal into a discrete time value is known as sampling. Sampling requires quantization and quantization implies error. Quantization and sampling are thus an approximation process.

Discreteness is typically established in order to perform digital signal processing. The issue of deterministic versus random signals is based on the ability to mathematically predict output values of a signal function at a specific time given a certain number of previous outputs of the function. These predictions are the basis of functions that can replicate a given signal for reproduction purposes. When such predictions are mathematically too complicated or are not reasonably accurate, statistical techniques may be used to describe the probabilistic characteristics of the signal. In many real world applications, however, determinations of whether a signal, or part of a signal, is indeed random or not is difficult at best. The watermark systems described in earlier disclosures mentioned above have a basis in analyzing signals so that analysis of discrete time frames can be made to insert information into the signal being watermarked. When signal characteristics are measured, a key factor in securely encoding digital watermarks is the ability to encode data into a carrier signal in a way that mimics randomness or pseudo randomness so that unauthorized attempts at erasing the watermark necessarily require damage to the content signal. Any randomness that exists as a part of the signal, however, should be estimated in order that a party seeking to optimally watermark the input signal can determine the best location for watermark information and to make any subsequent analysis to determine the location of said watermarks more difficult. Again, typical implementations of signal processing that use z-transforms seek to describe what parts of the signal are deterministic so that they may be described as a compact, predictable function so that the signal maybe faithfully reproduced. This is the basis for so-called linear predictive coding techniques used for compression. The present invention is concerned with descriptions of the signal to better define just what parts of the signal are random so that digital watermarks may be inserted in a manner that would make them more or less tamperproof without damage to the carrier signal. Additional goals of the system are dynamic analysis of a signal at discrete time intervals so that watermarks may be dynamically adjusted to the needs of users in such instances as on-the-fly encoding of watermarks or distribution via transmission media (telephone, cable, electric powerlines, wireless, etc.)

Signal characteristics, if they can be reasonably defined, are also important clues as to what portion or portions of a given signal comprise the "aesthetically valuable" output signal commonly known as music or video. As such, perceptual coding or linear predictive coding is a means to accurately reproduce a signal, with significant compression, in a manner that perfectly replicates the original signal (lossless compression) or nearly replicates the signal (lossy compression). One tool to make better evaluations of the underlying signal includes the class of linear time-invariant (LTI) systems. As pointed out in Digital Signal Processing (Principles, Algorithms, and Applications), 3rd Ed. (Proakis and Manolakis), (also Practical DSP Modeling, Techniques, and Programming in C by Don Morgan) the z-transform makes possible analysis of a continuous-time signal in the same manner as discrete-time signals because of the relationship between "the convolution of two time domain signals is equivalent to multiplication of their corresponding z-transforms." It should be clear that characterization and analysis of LTI systems is useful in digital signal processing; meaning DSP can use a z-transform and invert the z-transform to deterministically summarize and recreate a signal's time domain representation. Z-transforms can thus be used as a mathematical way in which to describe a signal's time domain representation where that signal may not be readily processed by means of a Fourier transform. A goal of the present invention is to use such analysis so as to describe optimal locations for watermarks in signals which typically have components both of deterministic and non-deterministic (predictable and unpredictable, respectively) nature. Such insertion would inherently benefit a system seeking to insert digital watermarks, that contain sensitive information such as copyrights, distribution agreements, marketing information, bandwidth rights, more general "neighboring rights," and the like, in locations in the signal which are not easily accessible to unauthorized parties and which cannot be removed without damaging the signal. Such a technique for determining watermark location will help ensure "pirates" must damage the content in attempts at removal, the price paid without a legitimate "key."

Some discussion of proposed systems for a frequency-based encoding of "digital watermarks" is necessary to differentiate the antecedents of the present invention which processes signals frame-by-frame and may insert information into frequencies without requiring the resulting watermark to be continuous throughout the entire clip of the signal. U.S. Pat. No. 5,319,735 to Preuss et al. discusses a spread spectrum method that would allow for jamming via overencoding of a "watermarked" frequency range and is severely limited in the amount of data that can be encoded—4.3 8-bit symbols per second. Randomization attacks will not result in audible artifacts in the carrier signal, or degradation of the content as the information signal is subaudible due to frequency masking. Decoding can be broken by a slight change in the playback speed. It is important to note the difference in application between spread spectrum in military field use for protection of real-time radio signals versus encoding information into static audio files. In the protection of real-time communications, spread spectrum has anti jam features since information is sent over several channels at once, and in order to jam the signal, you have to jam all channels, including your own. In a static audio file, however, an attacker has all the time and processing power in the world to randomize each sub-channel in the signaling band with no penalty to themselves, so the anti jam features of spread spectrum do not extend to this domain if the encoding is sub-audible. Choosing where to encode in a super-audible range of the frequency, as is possible with the present invention's antecedents, can better be accomplished by computing the z-transforms of the underlying content signal, in order to ascertain the suitability of particular locations in the signal for watermark information.

Instead of putting a single subaudible, digital signature in a sub-band as is further proposed by such entities as NEC, IBM, Digimarc, and MIT Media Lab, the antecedent inventions' improvement is its emphasis on frame-based encoding that can result in the decoding of watermarks from clips of the original full signal (10 seconds, say, of a 3 minute song). With signatures described in MIT's PixelTag or Digimarc/NEC proposals, clipping of the "carrier signal" (presently only based on results from tests on images, not video or audio signals which have time domains), results in clipping of the underlying watermark. Additionally, the present invention improves on previous implementations by providing an alternative computational medium to time/amplitude or frequency/energy domain (Fourier Transform) calculations and providing an additional measure by which to distinguish parts of a signal which are better suited to preserve watermarks through various DSP operations and force damage when attempts at erasure of the watermarks are undertaken. Further, the necessity of archiving or putting in escrow a master copy for comparison with suspect derivative copies would be unnecessary with the present invention and its proposed antecedents. Further, statistical techniques, not mathematical formulas, that are used to determine a "match" of a clip of a carrier signal to the original signal, both uneconomical and unreasonable, would not be necessary to establish ownership or other information about the suspect clip. Even if such techniques or stochastic processes are used, as in an audio spread-spectrum-based watermarking system being proposed by Thorn-EMI's CRL, called ICE, the further inability to decode a text file or other similar file that has been encoded using a watermark system as previously disclosed by above-mentioned U.S. patent applications including "Steganographic Method and Device", "Method for Human-Assisted Random Key Generation and Application for Digital Watermark System", "Method for Stega-cipher Protection of Computer Code", and "Optimal Methods for the insertion, Protection and Detection of Digital Watermarks in Digitized Data", where all "watermark information" resides in the derivative copy of a carrier signal and its clips (if there has been clipping), would seem archaic and fail to suit the needs of artists, content creators, broadcasters, distributors, and their agents. Indeed, reports are that decoding untampered watermarks with ICE in an audio file experience "statistical" error rates as high as 40%. This is a poor form of "authentication" and fails to establish more clearly "rights" or ownership over a given derivative copy. Human listening tests would appear a better means of authentication versus such "probabalistic determination". This would be especially true if such systems contain no provision to prevent purely random false-positive results, as is probable, with "spread spectrum" or similar "embedded signaling"—type "watermarks," or actually, with a better definition, frequency-based, digital signatures.

SUMMARY OF THE INVENTION

The present invention relates to a method of using z-transform calculations to encode (and/or decode) independent data (e.g., digital watermark data) to a digital sample stream.

The present invention additionally relates to a method of analyzing deterministic and non-deterministic components of a signal comprised of a digital sample stream. Carrier signal independent data is encoded in the digital sample stream and encoding of the carrier signal independent data is implemented in a manner such that it is restricted to or concentrated primarily in the non-deterministic signal components of the carrier signal. The signal components can include a discrete series of digital samples and/or a discrete series of frequency sub-bands of the carrier signal.

The present invention additionally relates to a method of using z-transform calculations to measure a desirability of particular locations of a sample stream in which to encode carrier signal independent data. The desirability includes a difficulty in predicting a component of the sample stream at a given location which can be measured by the error function.

The component and location may be comprised of information regarding at least one of the following: wave, amplitude, frequency, band energy, and phase energy. The present invention additionally relates to a method of encoding digital watermarks at varying locations in a sample stream with varying envelope parameters.

The present invention additionally relates to a method of using z-transform calculations to determine portions of a signal which may be successfully compressed or eliminated using certain processing techniques, without adverse impact on signal quality.

The present invention additionally relates to a method of encoding a digital watermark into a digital sample stream such that the watermark information is carried entirely in the most non-deterministic portions of the signal.

DETAILED DESCRIPTION

The Z-transform is a way of describing the characteristics of a signal. It is an alternative to time/amplitude and frequency/energy domain measures which expresses an estimate of periodic components of a discrete signal. In a digital signal processing environment, a sampling theorem, known specifically as the Nyquist Theorem, proves that band limited signals can be sampled, stored, processed, transmitted, reconstructed, desampled or processed as discrete values. For the theorem to hold, the sampling must be done at a frequency that is twice the frequency of the highest signal frequency one seeks to capture and reproduce. The time and frequency domains are thus implicitly important in developing functions that can accurately replicate a signal. In a third domain, the z-transform enables analysis of the periodic nature of discrete-time signals (and linear time-invariant systems) much as the Laplace transform plays a role in the analysis of continuous-time signals (and linear time-invariant systems). The difference is that the z-transform expresses results on the so-called z-plane, an imaginary mathematical construct which may be thought of as a Cartesian coordinate system with one axis replaced by imaginary numbers (numbers expressed in relation to the square root of $-1$). This may allow manipulations of signals which are not possible with Fourier Transform analyses (the frequency/energy domain). At the least, the z-transform is an alternative way to represent a signal. The imaginary number axis serves as a representation of the phase of the signal, where the phase oscillates through an ordered, bounded set of values over a potentially infinite series of discrete time values. Phase is the framework for representing the periodic nature of the signal. This third method of describing a discrete-time signal has the property of equating the convolution of two time-domain signals in the result of the multiplication of those signals' corresponding z-transforms. By inverting a z-transform, the time-domain representation of the signal may be approximately or wholly reconstructed.

To better define the z-transform, it is a power series of a discrete-time signal and is mathematically described hence:

$$X(z) = \sum_{n=-\infty}^{\infty} x(n) z^{-n}$$

where, x(n) is a discrete-time signal X(z) is a complex plane representation z is a complex variable Because the z-transform is an infinite power series, a region of convergence (ROC) is the set of all values of z where X(z) has a finite value, in other words, this is where the series has a computable value. Conversely, nonconvergence would mean randomness of the signal.

Where $z=0$ or $z=\infty$, the series is unbounded and thus the z-plane cannot be defined. What is required is a closed form expression that can only be described with a region of convergence (ROC) being specified. A coordinate in the imaginary z-plane can be interpreted to convey both amplitude and phase information. Phase is closely related to frequency information. Again, phase can be understood to oscillate at regular periods over infinite discrete time intervals, and is used to express information on the periodic nature of signals. Thus, as an alternative representation of a signal, the z-transform helps describe how a signal changes over time.

Some parameters of the region of convergence (ROC) necessitate the establishment of the duration (finite versus infinite) and whether the ROC is causal, anticasual, or two-sided. Special cases of signals include one that has an infinite duration on the right side, but not the left side; an infinite duration on the left side, but not the right side; and, one that has a finite duration on both the right and left sides—known, respectively, as right-sided, left-sided, and finite-duration two-sided. Additionally, in order to correctly obtain the time domain information of a signal from its z-transform, further analysis is done. When a signal's z-transform is known the signal's sequence must be established to describe the time domain of the signal—a procedure known as inverse z-transform, Cauchy integral theorem is an inversion formula typically used. Properties of the z-transform will now be described so that those skilled in the art are able to understand the range of computations in which z-transforms may be used for watermark related calculations.

Property Time Domain z-Domain ROC Notation x(n) X(z) ROC: r.sub.2<[z]<r.sub.1 x.sub.1 (n) X.sub.1 (z) ROC.sub.1 x.sub.2 (n) X.sub.2 (z) ROC.sub.2 Linearity a.sub.1 x.sub.1 (n)+a.sub.2x.sub.2 (n) a.sub.1 X.sub.1 (z)+a.sub.2 X.sub.2 (z) At least the intersection of ROC.sub.1 and ROC.sub.2 Time shifting x(n−k) z.sup.−k X(z) That of X(z), except z=0 if k>0 nd z=.infin. if k>0 Scaling in the z-domain a.sup.n x(n) X(a.sup.−1 z) [a]r.sub.2<[z]<[a]r.sub.1 Time reversal x(−n) X(z.sup.−1) 1/r.sub.1<[z]<1/r.sub.2 Conjugation x*(n) X*(z*) ROC Real Part Re{x(n)} ½{X(z)+X*(z*)} Includes ROC Imaginary Part Im{x(n)} ½{X(z)−X*(z*)} Includes ROC Differential in the nx(n)−z{−z((dX(z)/(dz))} r.sub.2<[z]<r.sub.1 z-domain Convolution (x.sub.1 (n))*(x2(n)) X.sub.1 (z)X.sub.2 (z) At least the intersection of ROC.sub.1 and ROC.sub.2 Correlation rx.sub.1 x.sub.2 (1)=x.sub.1 (1)*x.sub.2 (−1) Rx.sub.1 x.sub.2 (z)=X.sub.1 (z)X.sub.2 (z.sup.−1) At least the intersection of ROC of X.sub.1 (z) and X.sub.2 (z.sup.−1) Initial value theorem If x(n) causal x(0)=lim X(z) Multiplication x.sub.1 (n)x.sub.2 (n) ##EQU2## At least r.sub.11 r.sub.21<[z]<r.sub.1u r.sub.2u Parseval's relation ##EQU3##

Note: "[ ]" denote absolute values; For "Multiplication" and "Parseval's relation" the ".intg." is for "O.sub.c" a circle in the ROC. From Digital Signal Processing (Principles, Algorithms, and Applications)—3rd Ed. Proakis & Manolakis";

| Property | Time Domain | z-Domain | ROC |
|---|---|---|---|
| Notation | x(n) | X(z) | ROC: $r_2 < [z] < r_1$ |
|  | $x_1(n)$ | $X_1(z)$ | $ROC_1$ |
|  | $x_2(n)$ | $X_2(z)$ | $ROC_2$ |
| Linearity | $a_1 x_1(n) + a_2 x_2(n)$ | $a_1 X_1(z) + a_2 X_2(z)$ | At least the intersection of $ROC_1$ and $ROC_2$ |
| Time shifting | $X(n - k)$ | $z^{-1} X(Z)$ | That of X(z), except $z = 0$ if $k > 0$ nd $= \infty$ if $k > 0$ |
| Scaling in the z-domain | $a^n x(n)$ | $X(a^{-1} z)$ | $[a]r_2 < [z] < [a]r_1$ |
| Time reversal | x(−n) | $X(z^{-1})$ | $1/r_1 < [z] < 1/r_2$ |
| Conjugation | x*(n) | X*(z*) | ROC |
| Real Part | Re{x(n)} | 1/2{X(z) + X*(z*)} | Includes ROC |
| Imaginary Pail | Im{x(n)} | 1/2{X(z) − X*(z*)} | Includes ROC |

-continued

| Property | Time Domain | z-Domain | ROC |
|---|---|---|---|
| Differential in the z-domain | $nx(n)$ | $-z(-z((dX(z)/(dz)))$ | $r_2 < [z] < r_1$ |
| Convolution | $(x_1(n)) * (x_2(n))$ | $X_1(z)X_2(z)$ | At least the intersection of $ROC_1$ and $ROC_2$ |
| Correlation | $rx_1x_2(1) = x_1(1) * x_2(-1)$ | $Rx_1x_2(z) = X_1(z)X_2(z^{-1})$ | At least the intersection of ROC of $X_1(z)$ and $X_2(z^{-1})$ |
| Initial value theorem | If $x(n)$ causal | $x(0) = \lim X(z)$ | |
| Multiplication | $x_1(n)x_2(n)$ | $1/2\pi j \left\{ \int_{z1000}^{z1000} X_1(v)X_2((z/v)v^{-1} dv \right\}$ | At least $r_{1l}r_{2l} < [z] < r_{1u}r_{2u}$ |
| Parseval's relation | $\sum_{}^{\infty} X_1(n)X'_2(n) = 1/2\pi j \left\{ \int X_1(v)X'_2((1/v')v^{-1} dv \right\}$ | | |

Note:
"[ ]" denote absolute values; For "Multiplication" and "Parseval's relation" the "∫" is for "$0_c$" a circle in the ROC. From Digital Signal Processing (Principles, Algorithms, and Applications) - 3rd Ed. Proakis & Manolakis The inversion of the z-transform with three methods further described, in Digital Signal Processing (Principles, Algorithms, and Applications)—3rd Ed. Proakis & Manolakis, as 1) Direct evaluation by contour integration 2) Expansion into a series of terms, in the variables z, and $z^{-1}$ and 3) Partial-fraction expansion and table lookup. Typically the Cauchy theorem is used for direct evaluation. In determining causality, LTI systems are well-suited in establishing the predictability of time-domain characteristics with pole-zero locations. For applications of digital watermarks as described in the present invention the importance of both alternatively describing a signal and establishing deterministic characteristics of the signal's components is clear to those skilled in the art. Placing watermarks in the "random" parts of a signal, those that are difficult to predict and thereby compress, would enhance the security from attacks by pirates seeking to identify the location of said watermarks or erase them without knowing their specific location. Use of z-transforms to establish a more secure "envelope" for watermark insertion works to the advantage of those seeking to prevent such attacks. Similarly, creation of linear predictive coding filters is an excellent example that benefits from preanalysis of content signals prior to the insertion of watermarks.

This is an extension of the application of optimal filter design for applications for frame-based watermark systems as described in the above-mentioned patent applications entitled "STEGANOGRAPHIC METHOD AND DEVICE", "METHOD FOR HUMAN-ASSISTED RANDOM KEY GENERATION AND APPLICATION FOR DIGITAL WATERMARK SYSTEM", and "METHOD FOR STEGA-CIPHER PROTECTION OF COMPUTER CODE", "OPTIMAL METHODS FOR THE INSERTION, PROTECTION AND DETECTION OF DIGITAL WATERMARKS IN DIGITIZED DATA". Recursive digital filters are efficient for applications dependent on previous inputs and outputs and current inputs at a given time—a dynamic filter. The z-transform makes possible high performance of time domain digital filtering with implementation of recursive filters where signal characteristics are efficiently identified.

In one embodiment of the present invention, z-transform calculations are performed as an intermediate processing step, prior to the actual encoding of a digital watermark into a sample stream. The Argent™ digital watermark software, developed by The DICE Company, for example, uses a modular architecture which allows access to the sample stream and related watermark data at various stages of computation, and further allows modules to pass their results on (or back) to other modules. Z-transform calculations can be integrated into this processing architecture either directly in the CODEC module, which is responsible for encoding information to a series of samples, or decoding it from them, or as a FILTER module, which provides other modules with information on how specific types of filters will affect the sample stream. During processing, a series of sample frames are separated into groupings called "windows". Typically the groupings are comprised of contiguous series of samples, but this need not be the case. Any logical arrangement might be handled. Each sample window comprises a finite duration two-sided signal, a special case for z-transform calculations discussed above.

Each window may then be fed to a z-transform calculator (in a FILTER or CODEC module) which derives phase composition information from the signal using a z-transform algorithm. This information summarizes estimates of any regular phase components of the signal. Note that windows may be dynamically adjusted to be longer or shorter duration, or they may be computed in an overlapping fashion, with information about adjacent windows and their z-transforms being considered with regard to the current transform. Windows might have weightings applied to sample frames in order to emphasize some portions or de-emphasize others. Using these additional modifications may help to smooth discontinuities between window calculations and provide a better average estimate over longer portions of a signal.

The resulting z-transform information could be visualized by placing points of varying brightness or color (which corresponds to an amplitude) on the unit circle in the complex z-plane (the circle centered at z=0.0, 0.0 with radius 1). These points symbolize recurrent signal components at particular phases (where phase is determined by the angle of the line drawn between the point on the perimeter of the circle and its center). A deterministic approximation of the signal could then be reconstructed with all possible times represented by multiplying phase by the number of revolutions about the circle. Positive angle increments move forward in time, while negative increments move backward. The phase components yielded by the z-transform are then used to summarize and reproduce an estimate of the deterministic portion of the signal. Typically one may invert the z-transform calculations to produce this estimate in terms of a series of wave amplitude samples. By calculating the error rate and location of such errors in the estimated signal versus the original, the system can determine exactly where a signal is "most non-deterministic," which would constitute promising locations within the sample stream to encode watermark information. Note that location could be construed to mean any combination of sample, frequency or phase information.

The process described above is, in principle, an inversion of the type of process used for Linear Predictive Coding (LPC) and is a general example of "filter inversion" for optimal watermark planning. The type calculations are performed in order to determine what parts of the signal will survive the LPC process intact, and are thus good places to place watermarks which are to survive LPC. In LPC, the deterministic portion of a signal is compressed and the non-deterministic portion is either preserved as a whole with lossless compression or stochastically summarized and recreated randomly each time the "signal" is played back.

What is claimed is:

1. An article of manufacture comprising a non-transitory machine-readable medium, having thereon stored in non-transitory form instructions adapted to be executed by a processor, which instructions when executed by said processor result in a process of removing carrier signal independent data from a digital sample stream, comprising:
   receiving a digital sample stream encoded with carrier signal independent data;
   using linear predictive coding calculations to identify signal components of said digital sample stream; and
   extracting carrier signal independent data from said digital sample stream.

2. The article of claim 1, wherein said carrier signal independent data comprises digital watermark data.

3. The article of claim 1, wherein the step of extracting comprises:
   extracting carrier signal independent data based on one or more locations within said identified signal components.

4. The article of claim 1, wherein the step of extracting comprises:
   extracting carrier signal independent data with a key.

5. The article of claim 1, wherein said signal components comprise at least one of:
   a) a discrete series of digital samples, and
   b) a discrete series of carrier frequency sub-bands of the digital sample stream.

6. An article of manufacture comprising a non-transitory machine-readable medium, having thereon stored in non-transitory form instructions adapted to be executed by a processor, which instructions when executed by said processor result in a process of analyzing signal components in a digital sample stream, comprising:
   receiving a content signal comprising a digital sample stream;
   using linear predictive coding calculations to analyze signal components of said digital sample stream, said signal components being characterized by at least one of the following group:
   a) a discrete series of digital samples, and
   b) a discrete series of carrier frequency sub-bands of the content signal; and
   encoding carrier signal independent data in the signal components of the digital sample stream.

7. The article of claim 6, wherein said carrier signal independent data comprises digital watermark data.

8. The article of claim 6, wherein the step of encoding carrier signal independent data comprises:
   encoding carrier signal independent data such that it is concentrated primarily in the non-deterministic signal components of the content signal and such that said carrier signal independent data is located within the non-deterministic signal components using information about the position of a watermarking party in a distribution chain.

9. An article of manufacture comprising a non-transitory machine-readable medium, having thereon stored in non-transitory form instructions adapted to be executed by a processor, which instructions when executed by said processor result in a process of using linear predictive coding calculations to measure a desirability of locations in a digital signal in which to encode carrier signal independent data, comprising:
   receiving a digital signal;
   and using linear predictive coding calculations to identify locations in said digital signal which would be desirable for encoding carrier signal independent data; and
   wherein said locations are identified using at least one of the following characteristics of said digital signal: wave, amplitude, frequency, band energy, and phase energy.

10. The article of claim 9, further comprising:
    encoding said carrier signal independent data into said identified locations of said digital signal to produce an embedded digital signal.

11. The article of claim 10, further comprising:
    compressing the carrier signal independent data before the encoding step.

12. The article of claim 10, further comprising:
    compressing the digital signal before using linear predictive coding information to identify locations.

13. The article of claim 10, further comprising:
    compressing the embedded digital signal.

14. The article of claim 10, further comprising:
    compressing the carrier signal independent data before the encoding step and compressing the embedded digital signal.

15. An article of manufacture comprising a non-transitory machine-readable medium, having thereon stored in non-transitory form instructions adapted to be executed by a processor, which instructions when executed by said processor result in a process of using linear predictive coding calculations to detect at least one of a plurality of digital watermarks from a content signal, comprising:
    receiving a content signal;
    using linear predictive coding calculations to identify signal components of said content signal, said signal components being characterized by at least one of the following groups:
    a) a discrete series of digital samples, and
    b) a discrete series of carrier frequency sub-bands of the content signal; and
    detecting the at least one of a plurality of digital watermarks from said signal components of said content signal.

16. The article of claim 15, wherein the content signal is an analog waveform.

17. The article of claim 15, wherein the signal components are non-contiguous.

18. The article of claim 15, wherein the content signal may first be decompressed before using linear predictive coding to identify signal components.

19. The article of claim 15, wherein the location of at least a portion of the at least one of a plurality of digital watermarks is represented by at least one of the following: sample, frequency, phase or combinations thereof.

20. The article of claim 15, wherein the step of detecting comprises:

detecting the at least one of a plurality of digital watermarks based on one or more locations within said signal components.

21. The article of claim 15, wherein the signal components are identified using at least one of the following characteristics of the content signal: wave, amplitude, frequency, band energy, and phase energy.

22. The article of claim 15, wherein the linear predictive coding calculations enable compression of predictable signal components and at least one of the following:

a) preservation of unpredictable signal components and b) stochastic representation of unpredictable signal components.

23. The method of claim 15, wherein at least one of the plurality of digital watermarks is accessible with a key.

* * * * *

UNITED STATES PATENT AND TRADEMARK OFFICE
CERTIFICATE OF CORRECTION

PATENT NO. : 8,225,099 B2
APPLICATION NO. : 12/798959
DATED : July 17, 2012
INVENTOR(S) : Moskowitz It is certified that error appears in the above-identified patent and that said Letters Patent is hereby corrected as shown below:

Delete the passage in column 8 lines 24-49 reading:
"Property Time Domain z-Domain ROC Notation x(n) X(z) ROC: r.sub.2<[z]<r.sub.1 x.sub.1 (n) X.sub.1 (z) ROC.sub.1 x.sub.2 (n) X.sub.2 (z) ROC.sub.2 Linearity a.sub.1 x.sub.1 (n)+a.sub.2x.sub.2 (n) a.sub.1 X.sub.1 (z)+a.sub.2 X.sub.2 (z) At least the intersection of ROC.sub.1 and ROC.sub.2 Time shifting x(n-k) z.sup.-k X(z) That of X(z), except z=0 if k>0 nd z=.infin. if k>0 Scaling in the z-domain a.sup.n x(n) X(a.sup.-1 z) [a]r.sub.2<[z]<[a]r.sub.1 Time reversal x(-n) X(z.sup.-1) 1/r.sub.1<[z]<1/r.sub.2 Conjugation x*(n) X*(z*) ROC Real PartRe{x(n)} 1/2{X(z)+X*(z*)} Includes ROC Imaginary Part Im{x(n)} 1/2{X(z)-X*(z*)} Includes ROC Differential in the nx(n)-z{-z((dX(z)/(dz))} r.sub.2<[z]<r.sub.1 z-domain Convolution (x.sub.1 (n))*(x2(n)) X.sub.1 (z)X.sub.2 (z) At least the intersection of ROC.sub.1 and ROC.sub.2 Correlation rx.sub.1 x.sub.2 (1)=x.sub.1 (1)*x.sub.2 (-1) Rx.sub.1 x.sub.2 (z)=X.sub.1 (z)X.sub.2 (z.sup.-1) At least the intersection of ROC of X.sub.1 (z) and X.sub.2 (z.sup.-1) Initial value theorem If x(n) causal x(0)=lim X(z) Multiplication x.sub.1 (n)x.sub.2 (n) ##EQU2## At least r.sub.11 r.sub.21<[z]<r.sub.1u r.sub.2u Parseval's relation ##EQU3##

Note: "[ ]" denote absolute values; For "Multiplication" and "Parseval's relation" the ".intg." is for "O.sub.c" a circle in the ROC. From Digital Signal Processing (Principles, Algorithms, and Applications)--3rd Ed. Proakis & Manolakis";"

Signed and Sealed this
Twenty-seventh Day of November, 2012

David J. Kappos
*Director of the United States Patent and Trademark Office*